US012547620B2

United States Patent
Sukumar et al.

(10) Patent No.: US 12,547,620 B2
(45) Date of Patent: Feb. 10, 2026

(54) NETWORK CONFIGURATION AND MONITORING USING A FEDERATED GATEWAY

(71) Applicant: Home Depot Product Authority, LLC, Atlanta, GA (US)

(72) Inventors: Vimalan Sukumar, Atlanta, GA (US); Tushar Pujara, Atlanta, GA (US)

(73) Assignee: Home Depot Product Authority, LLC, Atlanta, GA (US)

(*) Notice: Subject to any disclaimer, the term of this patent is extended or adjusted under 35 U.S.C. 154(b) by 105 days.

(21) Appl. No.: 18/108,305

(22) Filed: Feb. 10, 2023

(65) Prior Publication Data

US 2024/0273097 A1 Aug. 15, 2024

(51) Int. Cl.
*G06F 16/2453* (2019.01)
*G06F 16/21* (2019.01)

(52) U.S. Cl.
CPC ...... *G06F 16/24542* (2019.01); *G06F 16/211* (2019.01)

(58) Field of Classification Search
CPC .......... G06F 16/24542; G06F 16/211
See application file for complete search history.

(56) References Cited

U.S. PATENT DOCUMENTS

| | | | | |
|---|---|---|---|---|
| 9,032,017 B1* | 5/2015 | Singh | ...... | G06F 16/25 709/219 |
| 9,646,028 B2 | 5/2017 | Schrock | | |
| 10,182,129 B1* | 1/2019 | Peterson | ...... | H04L 41/0895 |
| 2009/0049012 A1* | 2/2009 | Bossman | ...... | G06F 16/24549 |
| 2015/0286684 A1* | 10/2015 | Heinz | ...... | G06F 16/24568 707/769 |
| 2023/0016946 A1* | 1/2023 | Wouhaybi | ...... | G06F 16/907 |

OTHER PUBLICATIONS

Agarwal, Saurav. An approach of SLA violation prediction and QoS optimization using regression machine learning techniques. MS thesis. University of Windsor (Canada), 2020.*

Venkata, Santhilata Kuppili, and Katarzyna Musial. "Sub-query Fragmentation for Query Analysis and Data Caching in the Distributed Environment." arXiv preprint arXiv:1910.04991 (2019).*

(Continued)

*Primary Examiner* — Mohsen Almani

(74) *Attorney, Agent, or Firm* — Greenberg Traurig, LLP

(57) ABSTRACT

Various systems, computer-implemented methods, and computer program products are disclosed that use improved machine learning models to provide optimized network configurations to send, receive, and process data based on a request for data from upstream services. A device may receive a first query defining a request for data, analyze the first query, and determine one or more query parts. A device may generate, via a machine learning model, a query plan for fulfilling the first query using one or more nodes and transmit a second query to one or more services based on the query plan. A device may obtain a dataset from the one or more services as a response to the first query and the second query. A device may detect, via the machine learning model, for an anomaly based on fulfilling the first query.

19 Claims, 6 Drawing Sheets

(56) References Cited

OTHER PUBLICATIONS

Bogdanov, Kirill. Enabling Fast and Accurate Run-Time Decisions in Geo-Distributed Systems: Better Achieving Service Level Objectives. Diss. KTH Royal Institute of Technology, 2018.*
Ahmed, Jawwad, et al. "Predicting sla violations in real time using online machine learning." arXiv preprint arXiv:1509.01386 (2015).*
Müller Cejas, Carlos Guillermo, et al. "Comprehensive explanation of SLA violations at runtime." IEEE transactions on services computing 7.2 (2014).*
Sumalatha, M. R., et al. "Hash mapping strategy for improving retrieval effectiveness in semantic cache system." 2007 International Conference on Signal Processing, Communications and Networking. IEEE, 2007. (Year: 2007).*
Apollo GraphQL [online], retrieved from https://www.apollographql.com/ on Aug. 22, 2023, 4 pp.
GraphQL Code Libraries [online], retrieved from https://graphql.org/code/ on Aug. 22, 2023, 78 pp.
GraphQL specification [online], retrieved from https://graphql.org on Aug. 22, 2023, 5 pp.
Introduction to Apollo Federation [online], retrieved from https://www.apollographql.com/docs/federation/ on Aug. 22, 2023, 10 pp.

* cited by examiner

NETWORK CONFIGURATION AND MONITORING USING A FEDERATED GATEWAY

FIELD

The present disclosure generally relates to the field of network architecture. More particularly, to application routing in a network configuration and monitoring using a federated gateway.

BACKGROUND

Generally, an entity, such as an online retailer, provides a variety of services to users that engage in commercial transactions with the entity (e.g., sell products through the online retailer). These services can include querying data based on the business logic of the user. The user interfaces with the computing device associated with the entity and transmits the request. Based on the query, the computing device routes the query to one or more services requesting data in response to the query. Typically, invoking the services is determined based on the framework for fulfilling queries and schemas that outline the conditions associated with requests. Accordingly, to obtain data from the services based on the business logic of the user, the format of the query from the user typically needs to comply with published schema from the services in order to obtain data from the network device.

SUMMARY

In some embodiments, a computer-implemented method includes receiving, by a first computing device at a gateway, a first query defining a request for data, analyzing, by the first computing device, the first query and determining one or more query parts, generating, by the first computing device and via a machine learning model, a query plan for fulfilling the first query using one or more nodes, transmitting, by the first computing device, a second query to one or more services based on the query plan, obtaining, by the first computing device, a dataset from the one or more services as a response to the first query and the second query, and detecting, by the first computing device and via the machine learning model, for an anomaly based on fulfilling the first query.

In some embodiments, the computer-implemented method further includes determining the one or more nodes and the one or more services to invoke based on the query plan and controlling an operation of the one or more nodes to fulfill the query plan.

In some embodiments, generating the query plan further includes determining patterns for invoking the one or more nodes to fulfill the query plan, and controlling, by the first computing device, an operation of the one or more nodes based on the patterns to fulfill the first query.

In some embodiments, the patterns include asynchronous patterns and reactive patterns for activating the one or more services to provide for orchestration of the one or more nodes to optimize query fulfillment efficiency.

In some embodiments, the computer-implemented method further includes obtaining, by the first computing device, polling data including schemas published by the one or more services and route data, validating the schemas published with the one or more services, and creating a unified schema based on the validated schema.

In some embodiments, the query plan is determined based on the unified schema and the route data.

In some embodiments, analyzing the first query and determining one or more query parts further includes classifying, by the first computing device, the first query and the one or more query parts as static query parts and dynamic query parts, and caching, by the first computing device, the one or more query parts to reduce a network payload size.

In some embodiments, the static query parts are cached based on a caching strategy; wherein the caching is further based on a time to live (TTL).

In some embodiments, detecting for the anomaly further includes extracting, by the first computing device and via a machine learning model, object instances in data generated during a fulfillment of the query indicative of an anomaly and generating, by the first computing device, an alert based on detecting the anomaly, wherein the alert is generated in near real-time.

In some embodiments, the query plan is further based on the data generated during a previous query fulfillment.

In some embodiments, the query plan is further based on a latency metric of the one or more nodes.

In some embodiments, a system includes one or more processors, and a non-transitory computer readable media having stored thereon instructions that are executable by the one or more processors to cause the system to perform operations including receive a first query defining a request for data, analyze the first query and determining one or more query parts, generate, via a machine learning model, a query plan for fulfilling the first query using one or more nodes, classify the first query and the one or more query parts as static query parts and dynamic query parts, cache the static query parts based on a TTL to reduce a network payload size, determining one or more nodes and one or more services to invoke based on the query plan, controlling an operation of the one or more nodes to fulfill the query plan, transmit a second query to one or more services based on the query plan, obtain a dataset from the one or more services as a response to the first query and the second query, and detect for an anomaly based on fulfilling the first query.

In some embodiments, generating the query plan causes the system to further perform operations including determine patterns for invoking the one or more nodes to fulfill the query plan and control an operation of the one or more nodes based on the patterns to fulfill the first query.

In some embodiments, the patterns include asynchronous patterns and reactive patterns for activating the one or more services to provide for orchestration of the one or more nodes to optimize query fulfillment efficiency.

In some embodiments, the system further performs operations including obtain polling data including schemas published by the one or more services and route data, validate the published schema with the one or more services, and create a unified schema based on the validated schema.

In some embodiments, the query plan is determined based on the unified schema and the route data.

In some embodiments, detecting for the anomaly causes the system to further perform operations including extract, via a machine learning model, object instances in data generated during a fulfillment of the first query indicative of an anomaly and generate an alert based on detecting the anomaly, wherein the alert is generated in near real-time.

In some embodiments, a computer program product embodied on one or more non-transitory computer readable media having stored thereon instructions that are executable by one or more processors to cause the computer program product to perform operations including receive a first query defining a request for data, analyze the first query and determine a query plan including one or more query parts, determine asynchronous patterns and reactive patterns for invoking one or more nodes to fulfill the query plan, control an operation of one or more nodes based on the patterns to fulfill the first query, classify the first query and the one or more query parts as static query parts and dynamic query parts, cache the static query parts based on a TTL to reduce a network payload size, determine the one or more nodes and one or more services to invoke based on the query plan, control an operation of the one or more nodes to fulfill the query plan, transmit a second query to the one or more services based on the query plan, obtain a dataset from the one or more services as a response to the first query and the second query, and detect for an anomaly based on fulfilling the first query.

In some embodiments, the computer program product further performs operations including obtain polling data including schemas published by the one or more services and route data, validate the published schema with the one or more services, and create a unified schema based on the validated schema, wherein the query plan is determined based on the unified schema and the route data.

In some embodiments, detecting for the anomaly causes the computer program product to further perform operations including extract, via a machine learning model, object instances in data generated during the query fulfillment indicative of an anomaly, and generate an alert based on detecting the anomaly, wherein the alert is generated in near real-time.

BRIEF DESCRIPTION OF THE DRAWINGS

Some examples of the disclosure are herein described, by way of illustration only, with reference to the accompanying drawings. With specific reference now to the drawings in detail, it is stressed that the examples shown are for purposes of illustrative discussion of examples of the disclosure. In this regard, the detailed description taken with the drawings makes apparent to those of ordinary skill in the art how examples of the disclosure may be practiced.

DETAILED DESCRIPTION

Figure 1:
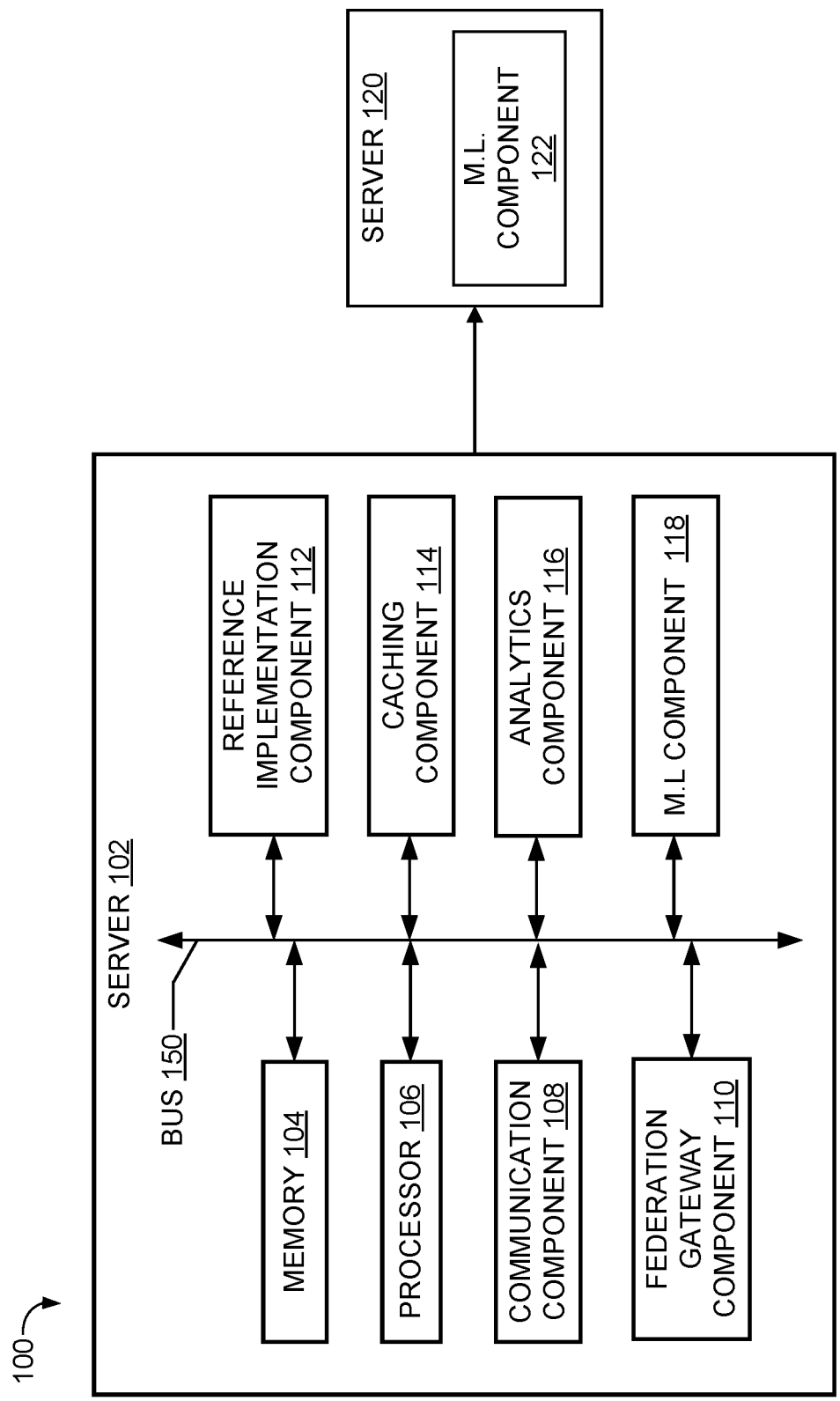
FIG. 1 depicts an example of a system 100 including an example of a server 102.

Network device(s) associated with an entity (e.g., online retailer) enables users (e.g., manufacturers) to interface with the network device and request data based on business logic of the user. In various examples, the network device typically implements an application programming interface (API) framework, such as REST or GraphQL, which users implement into their query to enable the users to interface with the network device and request data from the services associated with the network device. The network device receives the query based on this framework and the network device handles the upstream services calls to fulfill the query. In this regard, the network device invokes the one or more services to request for and/or obtain data corresponding to the query. The network device receives data from the one or more services in response to the query and the network device outputs the response data to the user computing device.

Network devices typically include a gateway application. The gateway application receives the query from the user computing device and routes the query to the services based on the network configuration. However, when there are changes to the network configuration at the network device (e.g., changes to schema or routes), a new gateway application typically needs to be deployed to validate and pick up the updates. Furthermore, when new services or applications are added, a manual cycle of coordination between the network device and the user computing device is typically performed to get the new applications onto the user ecosystem.

In responding to user queries, network devices typically implement and manage data resolvers (e.g., data fetchers) to handle the upstream service calls in a top down tree like sequence. Top level resolvers are executed first, and the framework then progresses down each level in the query resolver for execution once the previous level has completed. However, this approach depends upon upstream service calls completing prior to further progression of actions. Furthermore, because execution order is handled in a top down manner, service calls are executed in an order where an independent upstream service call first waits for completion of other service calls triggered by the parent resolver before executing. This leads to performance bottlenecks and latency issues that compound as application threads are delayed. Additionally, this impacts application throughput and results in increased inefficiency for responding to high volumes of queries.

As the entity scales the network, other challenges arise which further effect efficiency, such as configuring available services (e.g., addition/removal of services) and due to the increasing volume of queries. The resulting increased latency and bottlenecking leads to exceeding thresholds, as determined between the entity and the user (e.g., Service Level Agreement (SLA) or Service Level Objective (SLO)). For example, the SLO may outline that queries will return results within 5 minutes the latency issues delay the requested data and the entity exceeds the established threshold.

Among those benefits and improvements that have been disclosed, other objects and advantages of this disclosure will become apparent from the following description taken in conjunction with the accompanying figures. Detailed examples of the present disclosure are disclosed herein; however, it is to be understood that the disclosed examples are merely illustrative of the disclosure that may be embodied in various forms. In addition, each of the given examples are intended to be illustrative, and not restrictive.

Various examples herein include systems, devices, computer-implemented methods, apparatuses, and/or computer program products that can facilitate receiving a query from a user computing device, enlist one or more services based on the query, obtain data corresponding to a response from the one or more services, and provide data as output corresponding to results of the query to the user computing device. In various examples, the network device may include a machine learning model to orchestrate network routing paths and for anomaly detection as will the further described herein.

Example techniques herein include a library and framework to determine optimal routing paths at the network layer to services associated with the network device to fulfill the service call. The example techniques herein may improve the application performance latency by approximately 40% and also improve application throughput by approximately 30%. In various examples, the techniques herein may reduce operational and cloud costs and optimize resource consumption for applications. Accordingly, various techniques as disclosed herein can improve computer performance by leveraging asynchronous/reactive patterns from the library to manage orchestration to the nodes and/or services that form the network layer to improve resource utilization, thereby improving performance of the network device by reducing latency times, saving on processor cycles, memory usage, and power usage by these devices. In various examples, the techniques herein include a plug and play type model that may be used in any application that utilizes the same framework as a dependency. Furthermore, the various techniques herein can improve computer performance by improving efficiency of routing paths to nodes by eliminating redundant upstream service calls. As used herein, "nodes" includes software and/or hardware components for machines associated with the network. For example, the nodes are virtual machines, such as routers, that connect one or more computing devices and one or more networks and that move data packets through the network and/or to the upstream services.

Additionally, the example techniques herein can improve computer performance by implementing a caching strategy. In this example, the caching strategy may include an automatic persisted queries ("APQ") to reduce bandwidth and decrease latency. The APQs are parsed and cached in a datastore of the network device along with a unique identifier (i.e., hash). This enables users to transmit the hash instead of the corresponding query to reduce the request size. In another example, the techniques herein may include partial query data caching. Partial query data caching includes query interpolation and analysis for identifying nodes that can be served from a cache. In some examples, partial query data caching may include parsing a query into one or more query parts and caching the one or more query parts. As used herein, a "cache" includes hardware components or software components that store data that is the result of an earlier computation or may be data that is copied from an external source to enable future requests for that data to be served faster.

The techniques herein include a framework to determine a query cost. In this example, the query cost is determined by analyzing the query and recording the data corresponding to the costs (e.g., latency) associated with fulfilling the query. In some examples, determining the query cost may include categorizing the generated data based on fulfilling the query. In other examples, the data associated with fulfilling the query may include any of a plurality of data including, but not limited to, parsing the query, determining a query plan, polling for schema, polling for routes, transmitting data packets to/from each node, latency of the services, compiling results data, outputting the compiled data as a response, other data, or any combinations thereof. In other examples, determining the query cost may include leveraging the information for analytics and triaging latency issues as will be further described herein.

The techniques herein include an anomaly detection framework. In this example, the anomaly detection framework is capable of being plugged into a new or existing network architecture to leverage data associated with fulfilling requests to reduce a mean time to detection ("MTTD") and mean time to repair ("MTTR") for anomalies and/or deviations. For example, the anomaly detection can reduce the MTTD deviations in the network device from 1 week to 1 day. In another example, the anomaly detection framework can reduce the MTTD deviations from 1 day to 1 hour or less.

In various examples, techniques herein can also improve computer performance by leveraging machine learning models to provide the anomaly detection framework. In some examples, the machine learning model may learn data patterns and establish benchmarks based on reference data to improve detection of anomalies or deviations from these benchmarks in real-time. In some examples, the anomaly detection framework may leverage machine learning to perform the anomaly detection to determine whether there is an anomaly or deviation for a query and whether it is approaching or exceeding a threshold value. In other examples, the reference dataset may include historical data corresponding to previous anomalies that may be utilized by machine learning models to detect future anomalies.

In some examples, the anomaly detection framework may detect anomalies in near real time. In other examples, the anomaly detection framework may include dashboards and other reporting tools that may be presented to the entity, a representative of the entity (e.g., data engineer), the user, or combinations thereof. Accordingly, the various techniques herein minimize the user impact resulting from deviations that exceed an accepted SLO.

It should be appreciated that additional manifestations, configurations, implementations, protocols, etc. can be utilized in connection with the following components described herein or different/additional components as would be appreciated by one skilled in the art. However, not all of these components may be required to practice one or more examples, and variations in the arrangement and type of the components may be made without departing from the spirit or scope of various examples of the present disclosure.

FIG. 1 depicts a non-limiting example of a system 100, according to some examples. The example system 100 includes a server 102. In some examples, the system 100 may further include a server 120. In some examples, the system 100 may include computerized tools (e.g., any suitable combination of computer-executable hardware and/or computer-executable software) which can be configured to perform various functions relating to query fulfillment through managing a network architecture to improve query response times at multiple levels throughout the network. It is to be understood that the system 100 (e.g., server 102, server 120) may include any of a plurality of systems, devices (e.g., server-based network devices, computing devices), machines, hardware, software, or any combinations thereof suitable for receiving a query via an API from a computing device and providing an output dataset in response to the query according to various examples of the present disclosure.

The example server 102 includes a bus 150. In this example, the bus 150 is in electrically communicable connection with one or more of the other components of the server 102. In some examples, the other components of the server 102 as described herein may also be communicatively or operatively coupled to one another via the bus 150. For example, the federation gateway component 110 obtains poll data from the memory 104 through the bus 150.

The example server 102 includes a memory 104 and a processor 106. In this example, the memory 104 includes one or more datasets stored thereon and that may be accessed by the server 102 and the other components of the server 102 according to various examples of the present disclosure. In this example, the processor 106 executes the instructions stored in the memory 104 to enable the server 102 to perform operations according to various examples of the present disclosure.

In some examples, the memory 104 may be a non-transitory computer readable media having stored thereon instructions executable by the server 102 to perform various operations as discussed herein. In this example, the memory 104 also includes data corresponding to a machine learning model deployable by the M.L. component 118 and/or the M.L. component 122 as will be further described herein. It is to be understood by one of ordinary skill in the art that the memory 104 may include one or more datasets that includes any of a plurality of data including, but not limited to, schemas, routes, queries, query parts, query plans, hash identifiers, reference data, machine learning model(s), other data, or any combinations thereof suitable for providing query fulfillment.

In this example, the memory 104 includes data corresponding to a common framework for the system 100 and the server 102. In some examples, the common framework includes a library of patterns representative of schemas and route data to manage path selection through the network to available nodes to fulfill service calls. Additionally, in this example, the memory 104 also includes data corresponding to a schema registry as will be further discussed herein.

The example server 102 includes a communication component 108. In this example, the communication component 108 provides capabilities for transmitting data between components of the server 102. In some examples, the communication component 108 may also provide for capabilities to send and receive data between the server 102 and another device. In some examples, the communication component 108 can send and receive data between the server 102 and the server 120. For example, the communication component 108 can send and receive data corresponding to the machine learning model and the reference dataset between the server 102 and the server 120. In this regard, in some examples, the updated machine learning model can be generated using M.L. component 122 of the server 120 and transmitted to the server 102 for the query fulfillment. In another example, the communication component 108 obtains the updated machine learning model(s) from the server 120 and stores the data corresponding to the machine learning model(s) in the memory 104. It is to be understood by one of ordinary skill in the art that the communication component 108 may send and receive any of a plurality of data between the server 102 and another device including, for instance, the machine learning model, reference dataset, schemas, routing data, thresholds, other data, or any combinations thereof.

It can be appreciated that the communication component 108 can possess the hardware required to implement a variety of communication protocols (e.g., infrared ("IR"), shortwave transmission, near-field communication ("NFC"), Bluetooth, Wi-Fi, long-term evolution ("LTE"), 3G, 4G, 5G, 6G, global system for mobile communications ("GSM"), code-division multiple access ("CDMA"), satellite, visual cues, radio waves, etc.) The server 102 and/or various respective components can additionally comprise various graphical user interfaces (GUIs), input devices, or other suitable components.

The example server 102 includes the federation gateway component 110. In this example, the federation gateway component 110 determines the query plan including orchestrating the network configuration to the applications in the network layer (e.g., nodes) based on the query plan and the common framework. The federation gateway component 110 determines the query plan based on the data being requested in the query. Accordingly, in this example, orchestrating the network configuration includes determining the routing paths between nodes and directing the data packets to the respective nodes and services, (e.g., subgraphs) based on the query and the query plan. Additionally, determining the query plan includes analysis, parsing, and interpolation of the query into query parts and including the query parts into the data packets to be forwarded to the respective upstream services. In some examples, the federation gateway component 110 may also control the respective nodes in the network layer that interface with each respective service to transmit the data packets including the query parts to the services via APIs.

Additionally, in this example, the federation gateway component 110 polls for data corresponding to schemas and route data from a data store in the memory 104 and uses the polled data to determine the query plan. In this regard, in some examples, the federation gateway component 110 may determine the query plan based, at least in part, on the polled data. In some examples, the polled data may include data corresponding to a unified schema. In some examples, the unified schema may include published schema obtained from the services. In other examples, the unified schema may include validated schemas that are determined by the federation gateway component 110 based on the published schema in the data store. In some examples, the polled data may include data corresponding to the routing paths between nodes in the network layer to serve the upstream dependencies. Additionally, in some examples, the server 102 may include a schema registry application that includes the polled data as will be further discussed herein.

In some examples, the federation gateway component 110 may determine the query plan based on the available applications and resources in the network. For example, the federation gateway component 110 may determine a query plan and the routing paths to fulfill a particular query based on the available nodes in the network layer and based on the latency metrics of the nodes. It is to be understood by one of ordinary skill in the art that the query plan may be based on any of a plurality of other factors including, for instance, the application services, the schema, the route data, other factors, or any combination thereof. In some examples, the federation gateway component 110 may include software and/or hardware components associated with a federation gateway layer. In some examples, the server 102 may include software and/or hardware components corresponding to the federation gateway layer.

In this example, the server 102 operates based on the common framework. In some examples, the user computing device may interface with the server 102 for transmitting the calls and responses between the user computing device and the server 102 including the query based on the framework of the server 102. In some examples, the federation gateway component 110 may transmit the response based on the API framework utilized by the requesting computing device. In some examples, the federation gateway component 110 may transmit the response based on the API framework utilized by the server 102. In some examples, the query may be based on any of a plurality of API frameworks. For example, the user computing device may generate the query based on a first framework and the server 102 may receive the query and execute the query based on a second framework of the server 102 and the server 102 generates a response dataset and transmits the response back to the user computing device based on the first framework.

The example server 102 includes the reference implementation component 112. In this example, the reference implementation component 112 includes data corresponding to the common framework utilized by the server 102 in fulfilling service calls in accordance with this disclosure. Accordingly, the common framework may include a library of building blocks utilized by the server 102 to handle service calls to fulfill the queries. In some examples, the common framework may enable new services to be plugged into the network and may reduce the time needed for implementation of the new service at the server 102 and into a user's ecosystem, compared to using manual integration and validation into the user's ecosystem.

The example server 102 includes the caching component 114. In this example, the caching component 114 provides a caching strategy and caching configuration for applications using various techniques as will be further described herein. It is to be understood by those of ordinary skill in the art, however, that the caching configuration may include any of a plurality of caching strategies including, but not limited to, parsing, APQ, partial query caching, or any combinations thereof suitable for improving response times for serving queries.

The example server 102 includes the analytics component 116. In this example, the analytics component 116 analyzes the query and the data generated as a result of the query fulfillment at the network layer and outputs a metric dataset. In some examples, the metric dataset includes data corresponding to metrics at the network layer based on the query fulfillment. In some examples, the metric dataset includes data corresponding to one or more object instances extracted from the data generates as a result of the query fulfillment. In some examples, the metric dataset may include data corresponding to throughput at the applications in the network layer for anomaly detection. For example, the metric dataset includes latency data at the nodes used in the query fulfillment of a particular query. In other examples, the analytics component 116 may obtain the metric dataset and may determine an anomaly detection based on the metric dataset. In some examples, the federation gateway component 110 may determine the query plan based on the metric dataset. In this regard, in some examples, the federation gateway component 110 may orchestrate the network configuration and direct the allocation and assignment of the nodes that may receive the data packets to fulfill the query plan and the respective query part based on the metric dataset.

In some examples, the analytics component 116 may be configured to analyze the metric dataset and generate an alert based on the anomaly detection. For example, the server 102 generates an alert provided on a display in communicable connection with the server 102 and to a system administrator associated with the entity indicating detection of the anomaly. In some examples, the anomaly detection and the alert may be generated in real time. In some examples, the anomaly detection and the alert may be generated in near real-time. It is to be understood by one of ordinary skill in the art that the analytics component 116 may apply any of a plurality of techniques including, but not limited to, anomaly detection, deviation detection, latency error, query cost, tracing, other techniques, or any combinations thereof suitable for the server 102 to measure operational characteristics of the server 102.

The example server 102 includes the M.L. component 118. In this example, the M.L. component 118 includes a machine learning model and may apply the machine learning model to a dataset. The machine learning model identifies and extracts object instances from the data in the dataset indicative of one or more feature values. Accordingly, the machine learning model is applied to the dataset as input and the machine learning model provides a dataset as output based on the analysis. In some examples, the dataset may include the metric dataset and the machine learning model may extract the object instances indicative of an anomaly detection. In other examples, the machine learning model may extract object instances indicative of a deviation detection. In some examples, the dataset may also include the polled data and the machine learning model may extract the object instances indicative of efficient network configurations to the upstream services at the network layer. In other examples, the dataset may include the routing paths and the machine learning model may extract object instances indicative of efficient routing paths between a set of nodes to fulfill a query part. For example, the machine learning model identifies object instances in the metric dataset indicative of a deviation towards a predefined threshold at a particular node in the network layer and the query plan may circumvent the particular node.

In some examples, the machine learning model may be applied to one or more datasets. For example, the machine learning model is applied to a dataset including the metric dataset and the polled data including the unified schema and the routing paths. In some examples, the one or more datasets may include a first dataset and a second dataset. For example, the first dataset corresponding to node characteristics (e.g., availability) and the second dataset corresponding to throughput metrics. In another example, the first dataset includes routing data based on individual node availability and the second dataset includes metric data corresponding to end-to-end tracing through each of the nodes during previous query fulfillment. It is to be understood that the machine learning model may be applied to any of a plurality of data including, for instance, the query, query plan, query fulfillment, query tracing, query costs, query caching, other data, or any combinations thereof suitable for having the machine learning model applied thereto to provide for efficient network configuration for improving application throughput and for anomaly detection.

In some examples, the machine learning model may include a first machine learning model and a second machine learning model. For example, the first machine learning model may be configured to determine the routing paths and the second machine learning model may be configured to determine the anomaly detection.

In some examples, a respective component of the server 102 may leverage the machine learning model to perform their respective function in accordance with the disclosure herein. In this example, the federation gateway component 110 applies the machine learning model to the query to determine the query plan. In this example, the federation gateway component 110 also applies the machine learning model to the polled data to determine an efficient network configuration for query fulfillment. In this example, the analytics component 116 applies the machine learning model to the metric dataset to provide for anomaly detection, but it would be understood by one or ordinary skill in the art that the machine learning model may be trained to analyze any of a plurality of datasets to extract object instances indicative of, for instance, anomalies, deviations, latency issues, bottlenecking, node availability, routing paths, other features, or any combinations thereof suitable for providing efficient application throughput and for anomaly detection in accordance with the present disclosure.

In some examples, the machine learning model may extract the object instances from the dataset based on a threshold value. In some examples, the threshold may be a predefined threshold. In other examples, the object instances may be identified based on a comparison of the dataset with a reference dataset to identify and extract the object instances. In some examples, the predefined threshold may be based on a service level objective ("SLO"). In some examples, the predefined threshold may be based on a service level objective ("SLA"). For example, the predefined threshold for detecting an anomaly at the nodes is based on an SLO between the user and the entity that defines a threshold for receiving a response to the query within one minute.

In some examples, the machine learning model may be trained to generate an updated machine learning model that may then be used to identify and extract the object instances from datasets to provide the query fulfillment. In some examples, the machine learning model may be trained based on a reference dataset to provide the updated machine learning model. In other examples, the machine learning model may identify and extract object instances from the one or more datasets during the query fulfillment based on the reference dataset.

The reference dataset includes data corresponding to historical data generated as a result of the query fulfillment by the server 102. In other examples, the reference dataset may include query data from other devices similar to server 102. In some embodiments, the reference dataset may be obtained from the server 120. In some examples, the machine learning model may be trained based on the reference dataset as will be further discussed herein. In some examples, the reference dataset may be used by the server 102 or the machine learning model to determine the anomaly and/or deviation. In some examples, the reference dataset may be used by the server 102 or the machine learning model to determine the routing paths. In some examples, the reference dataset may include supervised or unsupervised data corresponding to feature values extracted from historical data. For example, the reference data may include object instances from service calls to the catalog application service indicative of an anomaly based on the object instances exceeding a predefined threshold.

It is noted that the foregoing can include model training which can be utilized in order to improve accuracy of models described herein. In various examples, model training can be performed using the server 102 or another system herein (e.g., server 120). In various examples, the server 102 and the M.L. component 118 (or M.L. component 122) may train the machine learning model based on a reference dataset. In some examples, training the machine learning model may include obtaining historical data based on fulfilling previous queries, extracting a set of object instances from the data indicative of feature values, determining a reference dataset based on the set of object instances, and determining an updated machine learning model based on the reference dataset. To that end, the server 102 may obtain the updated machine learning model and apply the updated machine learning model to one or more datasets to provide for the query fulfillment.

Various examples herein can employ artificial-intelligence or machine learning systems and techniques to facilitate learning trends, behaviors, context-based scenarios, preferences, etc. in order to facilitate taking automated action with high degrees of confidence. Utility-based analysis can be utilized to factor benefit of taking an action against cost of taking an incorrect action. Probabilistic or statistical-based analyses can be employed in connection with the foregoing and/or the following. It is noted that systems and/or associated controllers, servers, or M.L. components (e.g., M.L. component 118 and/or M.L. component 122) herein can comprise artificial intelligence component(s) which can employ an artificial intelligence (AI) model and/or an M.L. model capable of learning to perform the above or below described functions (e.g., via training using historical training data and/or feedback data).

In some examples, M.L. component 118 and/or M.L. component 122 can comprise an A.I. and/or M.L. model that can be trained (e.g., via supervised and/or unsupervised techniques) to perform the above or below-described functions using historical training data comprising various context conditions that correspond to various management operations. In this example, such an A.I. and/or M.L. model can further learn (e.g., via supervised and/or unsupervised techniques) to perform the above or below-described functions using training data comprising feedback data, where such feedback data can be collected and/or stored (e.g., in memory) by an M.L. component 118 and/or M.L. component 122. In this example, such feedback data can comprise the various instructions described above/below that can be input, for instance, to a system herein, over time in response to observed/stored context-based information.

A.I./M.L. components herein can initiate an operation(s) associated with a based on a defined level of confidence determined using information (e.g., feedback data). For example, based on learning to perform such functions described above using feedback data, performance information, and/or past performance information herein, an M.L. component 118 and/or M.L. component 122 herein can initiate an operation associated with physical resource allocation and/or dynamic configuration of resources. In another example, based on learning to perform such functions described above using feedback data, an M.L. component 118 and/or M.L. component 122 herein can initiate an operation associated with updating a model (e.g., a tuning model herein).

In some examples, the M.L. component 118 and/or M.L. component 122 can perform a utility-based analysis that factors cost of initiating the above-described operations versus benefit. In this embodiment, an artificial intelligence component can use one or more additional context conditions to determine an appropriate distance threshold or context information, or to determine an update for a tuning model.

To facilitate the above-described functions, an M.L. component herein can perform classifications, correlations, inferences, and/or expressions associated with principles of artificial intelligence. For instance, an M.L. component 118 and/or M.L. component 122 can employ an automatic classification system and/or an automatic classification. In one example, the M.L. component 118 and/or M.L. component 122 employs a probabilistic and/or statistical-based analysis (e.g., factoring into the analysis utilities and costs) to learn and/or generate inferences. The M.L. component 118 and/or M.L. component 122 can employ any suitable machine-learning based techniques, statistical-based techniques and/or probabilistic-based techniques. For example, the M.L. component 118 can employ expert systems, fuzzy logic, support vector machines (SVMs), Hidden Markov Models (HMMs), greedy search algorithms, rule-based systems, Bayesian models (e.g., Bayesian networks), neural networks, other non-linear training techniques, data fusion, utility-based analytical systems, systems employing Bayesian models, and/or the like. In other examples, the M.L. component 118 and/or M.L. component 122 can perform a set of machine-learning computations. For example, the M.L. component 118 and/or M.L. component 122 can perform a set of clustering machine learning computations, a set of logistic regression machine learning computations, a set of decision tree machine learning computations, a set of random forest machine learning computations, a set of regression tree machine learning computations, a set of least square machine learning computations, a set of instance-based machine learning computations, a set of regression machine learning computations, a set of support vector regression machine learning computations, a set of k-means machine learning computations, a set of spectral clustering machine learning computations, a set of rule learning machine learning computations, a set of Bayesian machine learning computations, a set of deep Boltzmann machine computations, a set of deep belief network computations, a set of different machine learning computations, or any combinations thereof.

In various examples, the M.L. component 118 and/or M.L. component 122 can employ any suitable machine learning techniques. For example, the M.L. component 118 can employ anomaly and/or deviation detection techniques to extract one or more feature values and one or more characteristics corresponding to fulfilling service calls obtained from one or more components, applications, nodes, gateways, sensors, other objects, or any combinations thereof. In another example, the M.L. component 118 can employ data science techniques to extract one or more feature values and one or more characteristics corresponding to fulfilling queries using upstream service calls.

In some examples, the server 102 may also be communicatively coupled to a server 120. Furthermore, in some examples, the server 120 may include M.L. component 122 that may perform operations similar to M.L. component 118. It would be understood to those of ordinary skill in the art that the server 102 may include any of a plurality of components, including, but not limited to, the bus 150, memory 104, processor 106, communication component 108, federation gateway component 110, reference implementation component 112, caching component 114, analytics component 116, machine learning (M.L.) component 122, other components, or any combinations thereof suitable for providing query fulfillment and anomaly detection in accordance with the present disclosure.

Figure 2:
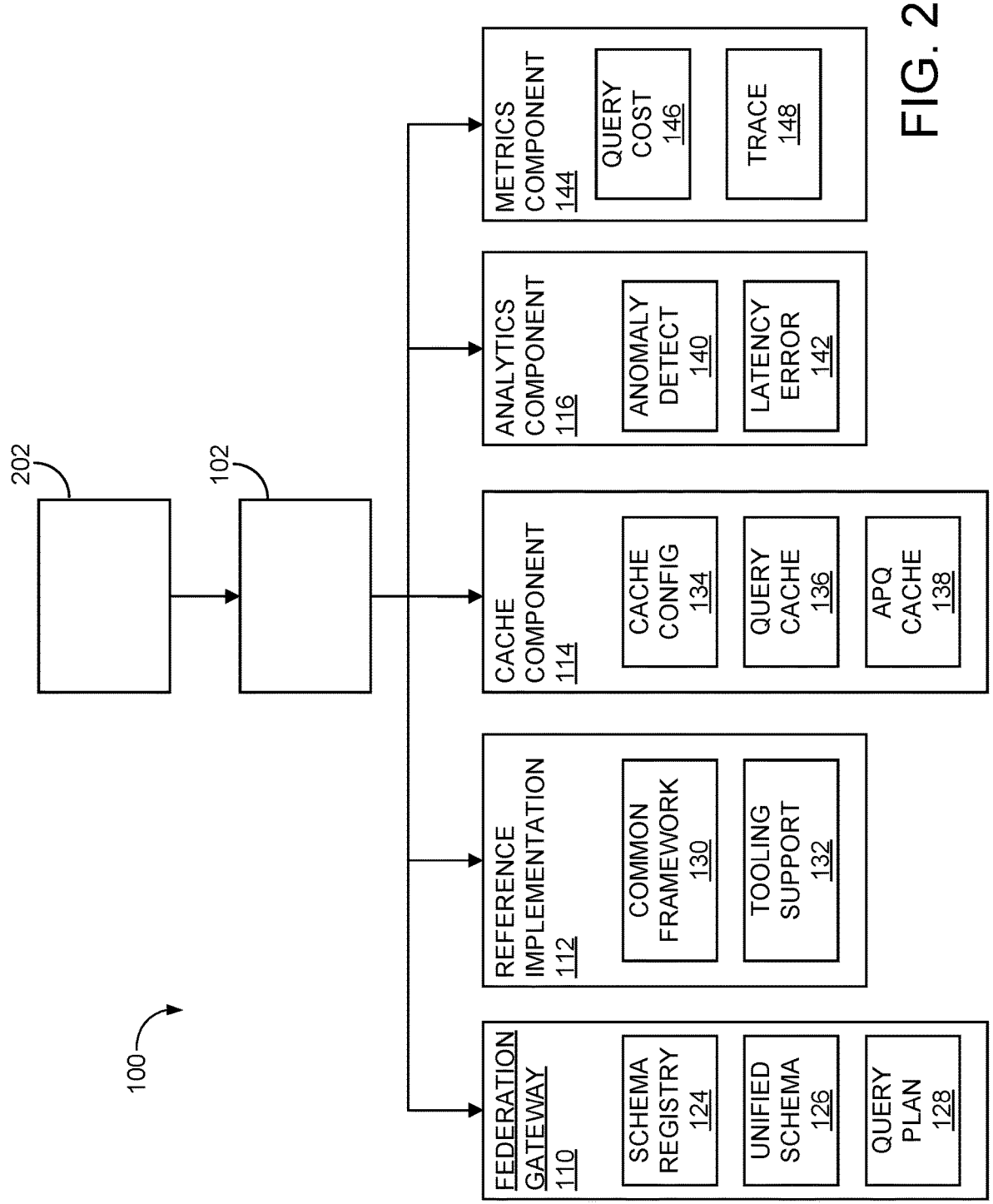
FIG. 2 depicts another example of the server 102 of FIG. 1.

FIG. 2 depicts another example of the server 102 of FIG. 1, according to some examples.

In this example, the federation gateway component 110 includes a schema registry application 124, a unified schema application 126, and a query plan application 128. The schema registry application 124 polls for data corresponding to the schemas and routes. The unified schema application 126 validates the published schema and creates a unified schema plan to provide for the server 102 to serve the correct upstream dependencies where the requested data can be obtained. The query plan application 128 utilizes the data stored in the schema registry application 124 and the query to determine the query plan.

As used herein, "unified schema," references a single, consistent view of the schema published and validated from the available services in the network and may include the definitions, classifications, attributes, etc., of the schema that enables the network to interface with the service to query data or to request the service perform some function.

In this example, the polled data includes schemas that are published by the application services in communicable connection with the server 102 and route data corresponding to routing paths between the nodes in the network layer. In some examples, the routing data may be based on the available nodes in the network layer. In other examples, the polled data may also include schema definitions.

The query plan is determined based on the polled data from the schema registry application 124. In some examples, the query plan may be based on the published schemas stored in the schema registry. In other examples, the query plan may be based on the unified schema. Additionally, in some examples, the query plan application 128 may determine the query plan based on the metric dataset indicative of the efficient network configuration based on the operational characteristics of the nodes that serve the query parts.

In some examples, the schema registry application 124 may create the route data to manage data traffic in the server 102 (e.g., the network). The route data enables path selection to the nodes in the network. In some examples, the route data may be based on available nodes in the network. In other examples, the route data may be based on congestion at the nodes in the network. For example, congestion in the network may be caused due to a high volume of queries. In another example, network congestion may be caused by failure at one or more nodes.

In some examples, the schema registry application 124 may periodically poll for data corresponding to the schema and routes. In some examples, the data may be stored in the memory 104. In other examples, the schema may be polled from application services. In some examples, the data may be persisted in a bucket associated with a cloud storage network. For example, the federation gateway component 110 may poll the buckets at intervals of once per day.

The query plan application 128 determines the query plan by analyzing the query, parsing the query received by the server 102 into one or more query parts, and interpolated each of the query parts into one or more data packets to be forwarded to the nodes that need the data to serve the upstream service calls. In this regard, the query plan application 128 determines the respective service that owns the data being requested in the respective query part based on the unified schema and the federation gateway component 110 then orchestrates forwarding the data packet to the respective service and orchestrates the routing of the data packet including the output from the application service in response to the call. In some examples, the query plan application 128 may then further assign one or more nodes to fulfill the query based on the query plan. In some embodiments, the one or more nodes may include a root node (e.g., parent) and one or more child nodes to serve the query parts. In other examples, the one or more nodes may include one or more root nodes and one or more child nodes to serve the query based on the query plan.

The response from the application service serving the query part includes data corresponding to results provided as output in response to the requested data that fulfills the query or query part. Accordingly, the federation gateway component 110 also receives the response data from the services via the nodes in the network layer. In some examples, the federation gateway component 110 may then transmit the data received from the application services corresponding to the requested data in the query to the computing device where the query originated as an output dataset. In other examples, the federation gateway component 110 may merge the response data received from each of the application services into the output dataset as a response to the query and then transmits the output dataset to the computing device where the query originated.

In various examples, the query plan application 128 may register each query plan in the data store associated with the memory 104. In some examples, the query plan may include the parsed query parts, but it would be understood by those of ordinary skill in the art that the query plan may include data corresponding to any of a plurality of other features including, for instance, the routing path, assigned nodes, alternate routing paths, destination application service, other features, or any combinations thereof suitable for providing for the query fulfillment and that may be utilized by the server 102 to determine the function and processes for fulfilling the query.

In this example, the reference implementation component 112 includes the common framework 130 and tooling support 132. The common framework 130 includes the library of building blocks that enables the server 102 to process queries and to invoke the services based on the query in communicable connection with the server 102. In some examples, the common framework 130 may include data corresponding to the asynchronous patterns and/or reactive patterns for orchestrating network configurations to handle the service calls. Accordingly, in some examples, the query plan application 128 may also determine the query plan for a particular query based on the common framework 130. In this example, the query plan application 128 identifies the upstream services to invoke in parallel and the upstream services that need to await execution of other service calls prior to initiation. In this regard, the query plan is based on the reactive and/or asynchronous libraries and patterns that define when to execute the parallel and dependent services that own the requested data. In some examples, the data received by the server 102 from the application services that corresponds to the responses from each application service may also be stored in a data store of the memory 104 as a context object. Additionally, in some examples, the context object may be passed around to child resolvers tasked with creating a data model specific to the resolver tasked with handling the query.

In this example, the tooling support 132 provides resources for gathering and analyzing network data based on serving queries to provide to the entity (e.g., network administrator). The resources include information on the operational characteristics of the server 102 and the components of the server 102. In some examples, the resources may be transmitted to a display of the server 102 via an interface. In other examples, the display may be in communicable connection with the server 102 and displayed on the interface. It would be understood by those of ordinary skill in the art that the tooling support 132 may provide for the collection and analysis of any of a plurality of characteristics associated with the server 102 or any components thereof including, but not limited to, status, latency, activity, configuration, settings, thresholds, or any combinations thereof suitable for network monitoring capabilities.

In this example, the server 102 also includes a metrics component 144. The metrics component 144 includes a query cost application 146 and a trace application 148. The query cost application 146 determines costs associated with handling costs. In some examples, the query cost application 146 may compare costs between queries. In other examples, the query cost application 146 may be applied to determine the costs associated with different configurations to provide an optimal network configuration for handling the service call. For example, the query plan may be based, at least in part, on the costs associated with fulfilling the query parts and the corresponding network configuration for the query parts. In some examples, the costs may be associated with execution of the parallel and dependent services. As used herein, "costs" refer to characteristics associated with the operation of the network device or applications associated with the network device, for instance, such as is provided in the metric dataset. Costs may include qualitative features, quantitative features, or both. Furthermore, it would be understood by one of ordinary skill in the art that the costs associated with fulfilling the query is not intended to be limiting and may include any of a plurality of measurable characteristics associated with the operation of the server 102 in accordance with the present disclosure.

In this example, the trace application 148 provides end-to-end traceability of the query while fulfilling the query by the server 102. The tracing may be based on live data points generated from fulfilling the query at the server 102. In some examples, the trace application 148 may trace the applications used during the query fulfillment. For example, the trace application 148 may trace the child nodes utilized during the fulfillment of a query part. In some examples, the trace application 148 may trace the query from receipt at the server 102 to when the server 102 provides a response dataset in response to the query. In other examples, the trace application 148 may be applied to associate the data generated during the query fulfillment with each application. In this regard, in some examples, the metric data, such as the costs associated with fulfilling the query, may also be based on the tracing of the query fulfillment by the trace application 148.

In some examples, the reference implementation component 112 may include a control pane application. In other examples, the tooling support 132 may include the control pane application. The control pane application enables the server 102 to relay information corresponding to operational characteristics of the server 102, such as during the query fulfillment, to the entity. In some examples, the server 102 may be in communicable connection with a display device and the control pane application may display a graphical user interface ("GUI") on the display device. Accordingly, the control pane application displays the information onto the display device using the GUI. Additionally, in some examples, the control pane application may receive one or more inputs at the GUI corresponding to interact with the GUI and to control the operation of the server 102. In some examples, the one or more inputs may also include network configuration parameters. In some examples, the one or more inputs may include one or more threshold values, but it would be understood that the one or more inputs can include, for instance, other inputs configured to control the operation of the server 102 to serve queries from external users and to provide for anomaly detection. In some examples, the control pane application may also be configured to display the GUI on the computing device 202 of the user.

In some examples, the control pane application enables configuration of the server 102 to provide plug and play capabilities to drive the available services of the system 100. Additionally, in some examples, the control pane application may provide for schema management including searching existing schema types. In other examples, schema management includes extending schema types based on the application service. In another example, the schema types may be extended through hooks. In some examples, the control pane application may enable setting threshold values corresponding to the operation of the server 102, such as to provide for anomaly detection during the query fulfillment. For example, the threshold values may be provided as inputs during onboarding of a new user based on a SLO to define the thresholds for anomaly detection during operation of the server 102.

In some examples, the control pane application may also provide a visual representation of the query plan. In some examples, the control pane application may provide a view of the time the packet corresponding to the query or query part spent in each layer in the network layer as part of the query processing. This provides the ability for a user to understand the mechanisms behind the gateway platform's query processing steps. In other examples, the control pane application may enable registration of a new application service into the server 102 to provide scalability of services. In this regard, registration of the application service may include providing inputs to integrate the application service to enable the server 102 to interface with the application service and for the application service to publish its schema to the server 102. In some examples, the user may interact with the control pane application to perform various functions. For example, the user can interact with the control pane application via the GUI to obtain a schema view of the available application services. It is to be understood by one of ordinary skill in the art that the control pane application may provide any of a plurality of information corresponding to the operation of the server 102 including, for instance, metrics, costs, tracing, latency, query caching, anomalies, other information, or any combinations thereof suitable for being provided as output to observe application throughput and to understand the mechanisms serving the query processing.

In this example, the caching component 114 includes a cache configuration 134, a query cache application 136, and an APQ application 138. The cache configuration 134 provides a caching strategy to optimize application throughput while handling service calls based on the query. In some examples, the cache configuration 134 also provides the caching strategy based on the network configuration and the nodes that are assigned to fulfill the query or query parts. The query cache application 136 then caches the query or query parts based on the caching strategy. In some examples, the query analysis, parsing, and interpolation may result in one or more query parts and the identification of the node or nodes tasked with fulfilling each query part. Accordingly, the query cache application 136 caches the query or query parts based on the caching strategy and to provide for optimized data referencing and retrieval by the applications while handling the service call. In some examples, the query cache application 136 caches the data in a local cache near the node or nodes. In other examples, the query cache application 136 caches the data in an edge cache.

In some examples, the cache configuration 134 may categorize the one or more query parts as a static query part and dynamic query part. In some examples, the static query part can be a query part that has been previously received at the server 102. In other examples, the static query part can be a query part that has been received at the server 102 over a certain threshold. In another example, the static query part can be a query part that utilizes a node or set of nodes at the network layer and where the network configuration for fulfilling the node has remained static. For example, the static query part may be for data from a particular service and where the network configuration has not changed over the previous five queries, and therefore would be better served as a static query instead of determining a network configuration for every query. Accordingly, the query cache application 136 may then cache the query part based on the classification. In some examples, the query cache application 136 caches the static query part. In other examples, the query cache application 136 may also cache the dynamic query part.

In some examples, the caching may be based on a time to live ("TTL") for the query part. For example, each query part may include a TTL associated with the query part and the static query parts are cached and the dynamic query parts are not cached based on the TTL. In this regard, in some examples, the query part caching may be based on the TTL to reduce the likelihood of stale data being utilized to handle the service calls where delays in query fulfillment may arise due to inefficient configurations based on outdated information.

In this example, the APQ application 138 generates hash keys and associates the hash key to the query and/or query part. Additionally, in this example, the query cache application 136 caches the query or query part payload to reduce the network payload size. In this regard, the APQ application 138 implements caching the query or query parts and instead forwarding the hash key. The subsequent receiving applications can then reference the query or query parts using the hash key rather than forwarding the entire payload. In some examples, the user may transmit the query including hash keys defining certain query parts. In some examples, the APQ application 138 may generate one or more hash keys for a query. For example, the query may be associated with a first hash key and each query part may include the first hash key and an individual hash key corresponding to the query part.

In this example, the analytics component 116 includes an anomaly detection application 140 and a latency error application 142. The anomaly detection application 140 enables the analytics component 116 to analyze the metrics data to identify and extract object instances from the data indicative of an anomaly with the performance of the applications at the network layer. For example, the metrics data may be indicative of the operational performance at a node or nodes and the anomaly detection application 140 may determine an anomaly with the performance of the node or nodes. Additionally, in some examples, the anomaly detection application 140 may determine a deviation in the application, such as if the operation performance of the application is approaching a threshold. In another example, the anomaly detection application 140 can identify that the throughput at a node has exceeded the threshold value.

The latency error application 142 enables the analytics component 116 to analyze the metrics data to identify and extract object instances from the data indicative of a latency error for an application at the network layer. In some examples, the latency error may be based on the throughput at the node. In other examples, the latency error may be based on the throughput at the series of nodes. In another example, the latency error may also be based on the size of the payload. Additionally, in some examples, the latency error may be based on the number of tasks performed by the node or nodes. For example, the analytics component 116 may analyze the metric dataset to determine the period of time between when the node received the data packet and when the node forwarded the data packet and determine a latency error at the node based on the time exceeding a threshold value.

Figure 3:
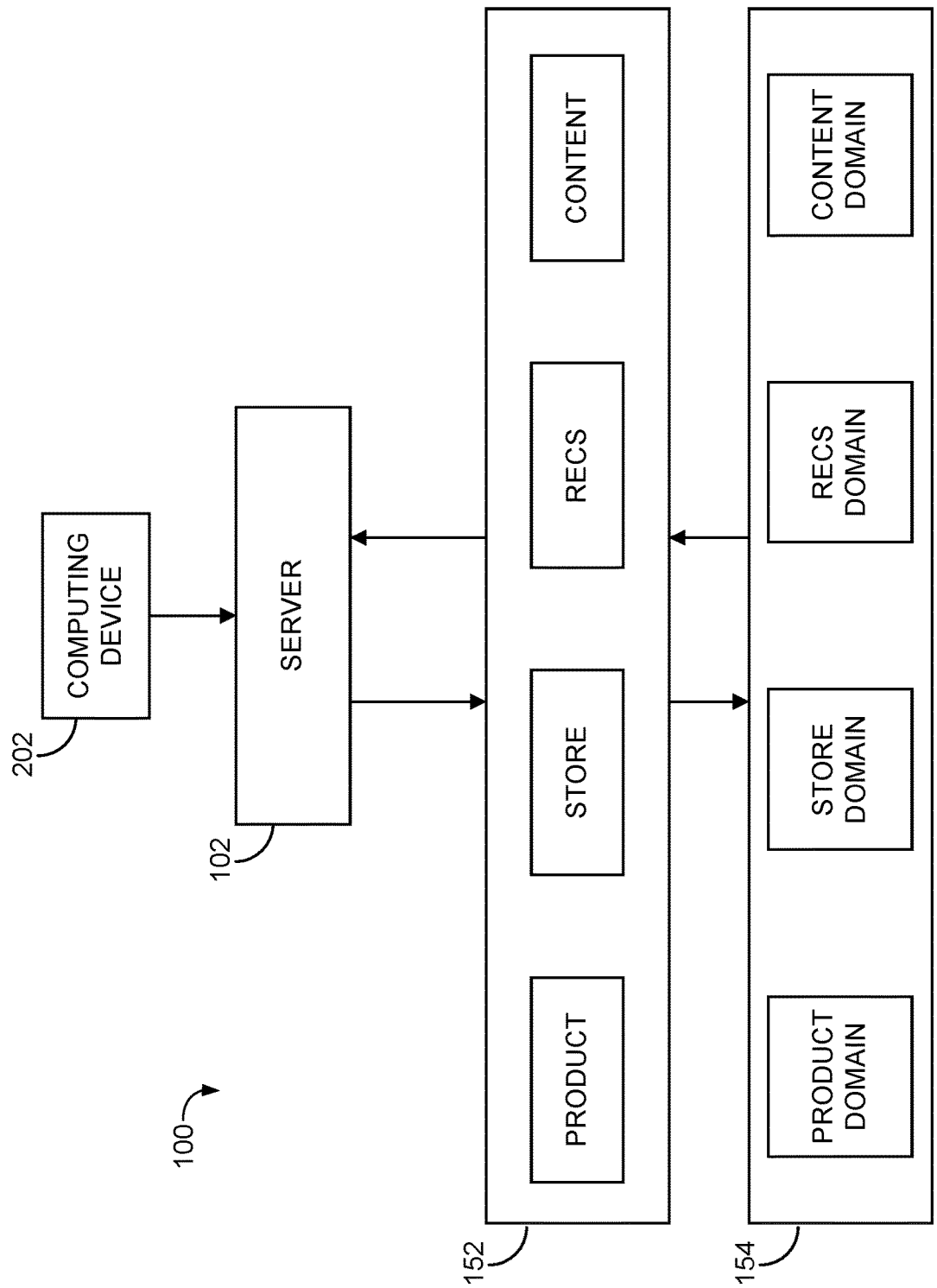
FIG. 3 depicts an example block diagram of the system 100 of FIG. 1.
Figure 4:
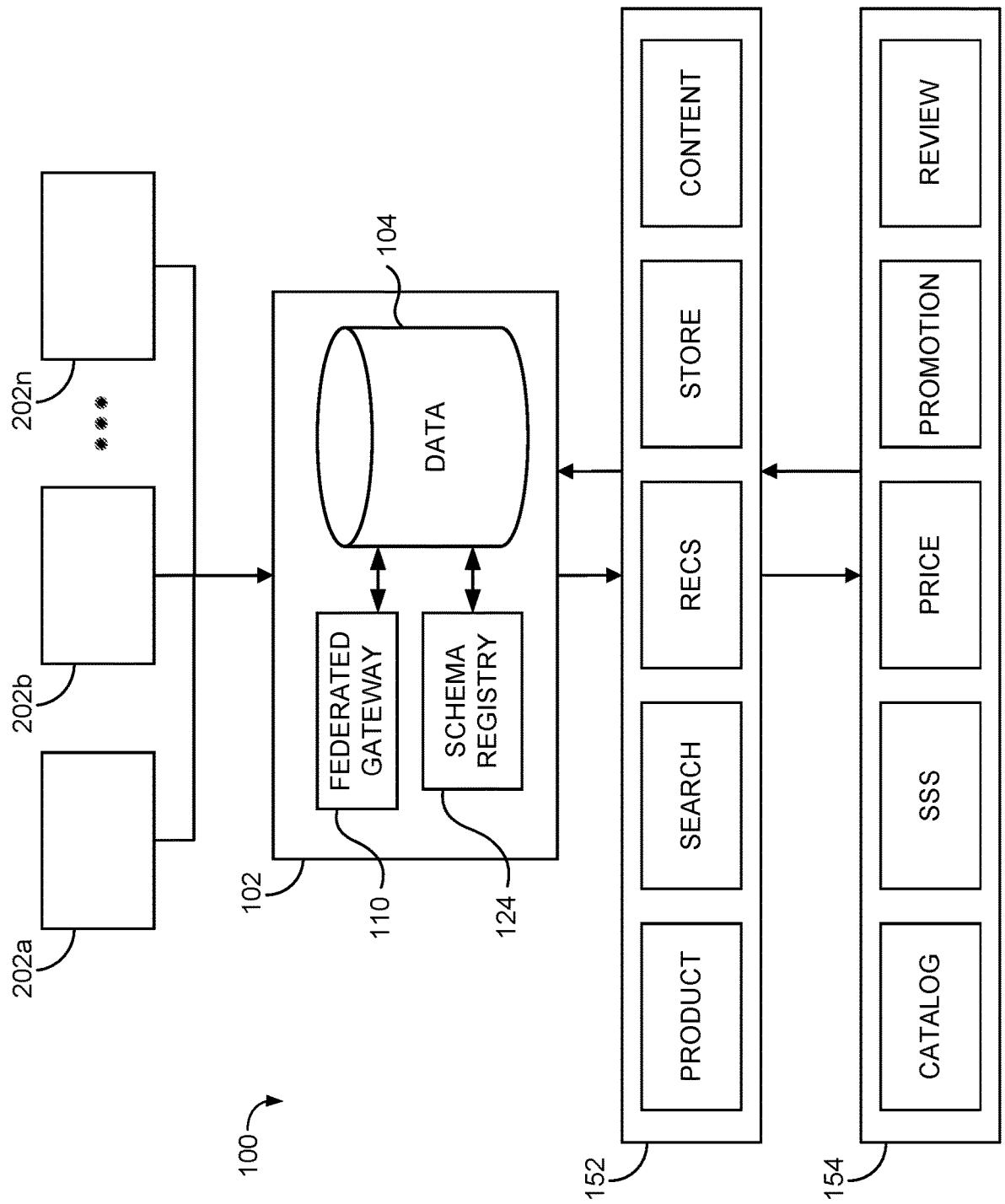
FIG. 4 depicts a second example block diagram of the system 100.

FIG. 3 depicts a non-limiting example block diagram of the system 100 of FIG. 1, according to some examples. FIG. 4 depicts a second non-limiting example block diagram of the system 100, according to some examples. Unless specified otherwise, FIGS. 3 and 4 will be referred to collectively.

In this example, a computing device 202 associated with a user (e.g., customer) interfaces with the system 100 (e.g., the server 102) and transmits their query to the system 100. The example system 100 receives the query and determines which application service or application services to invoke based on the query plan. To this end, the server 102 determines the network configuration for the query at the server 102 and routes the query and query parts to the appropriate nodes to invoke the services of the respective application service in application services 152. The server 102 invokes the respective service in application services 152 for the requested data based on the unified schema at server 102 which includes the schema, or parts thereof, that were published by each respective service to the server 102. Additionally, in this example, the application services 152 receives the query (e.g., the query parts) and the application services 152 or a particular application service in that layer, may provide a response to the query part that includes data based on the requested data. In this example, a node at the network layer serves as an end point and interfaces with a respective application service in the application services 152 to transmit the query part and to receive a dataset as response to the particular query part from the respective application service. Accordingly, in some examples, the application services 152 may define the layer that includes one or more application services that stores information that may be queried by the user through the server 102.

In some examples, the respective application services may be determined based on the unified schema as the unified schema defines the data that each respective application service owns and that may be invoked to fulfill the query. For example, the application services 152 may include a product application service storing data corresponding to the inventory of the entity and a store application service storing data corresponding to each physical store associated with the entity. It is to be understood that the application services 152 and domain services 154 are non-limiting and that the system 100 may include other upstream application services and domain services in accordance with this disclosure that may store information that may be queried by a user and that may be associated with a business logic of the user or the entity.

In this example, the system 100 includes domain services 154 in communicable connection with application services 152 to provide for added capabilities to the system 100. In some examples, the application services 152 may receive the query and may interface with domain services 154 to obtain the requested data. In other examples, a respective application service in the application services 152 may interface with the domain services 154 to obtain the requested data from the domain services 154. In another example, the respective application service in the application services 152 may interface with a particular domain service in the domain services 154 that stores the requested information or that may provide the requested data in response to the call by the respective application service. In this regard, in some examples, the respective application service may not own the requested data or may only store a portion of the requested data and the respective application service may interface with the domain services 154 or the respective domain service to retrieve the requested data to provide the data as response to the query part from the server 102. In this regard, in some examples, the query may be a first query and the server 102 may transmit a second query to the application services 152 based on the first query. Additionally, in some examples, the application services 152 may be further configured to transmit a third query to the domain services 154 based on the second query. In some examples, the third query may also be based on the first query. In some examples, the domain services 154 may include one or more domain services. In other examples, the domain services 154 may define a domain layer and may include one or more domain services. In this regard, in some examples, an application service from the layer defined by application services 152 may interface with a domain service in the layer defined by domain services 154 to send and receive data between the respective application service and the respective domain service.

Referring to FIG. 4, in this example, the server 102 may receive queries from a plurality of computing devices. In this example, the computing devices include computing devices 202a-202n. In some examples, the system 100 may include a plurality of server-based devices (e.g., server 102) configured to receive queries from external computing devices and handle the upstream service calls in response to fulfilling the queries. In other examples, each of the plurality of server-based devices may be in communicable connection with the application services 152 to invoke the respective application service based on the query and the query part.

Figure 5:
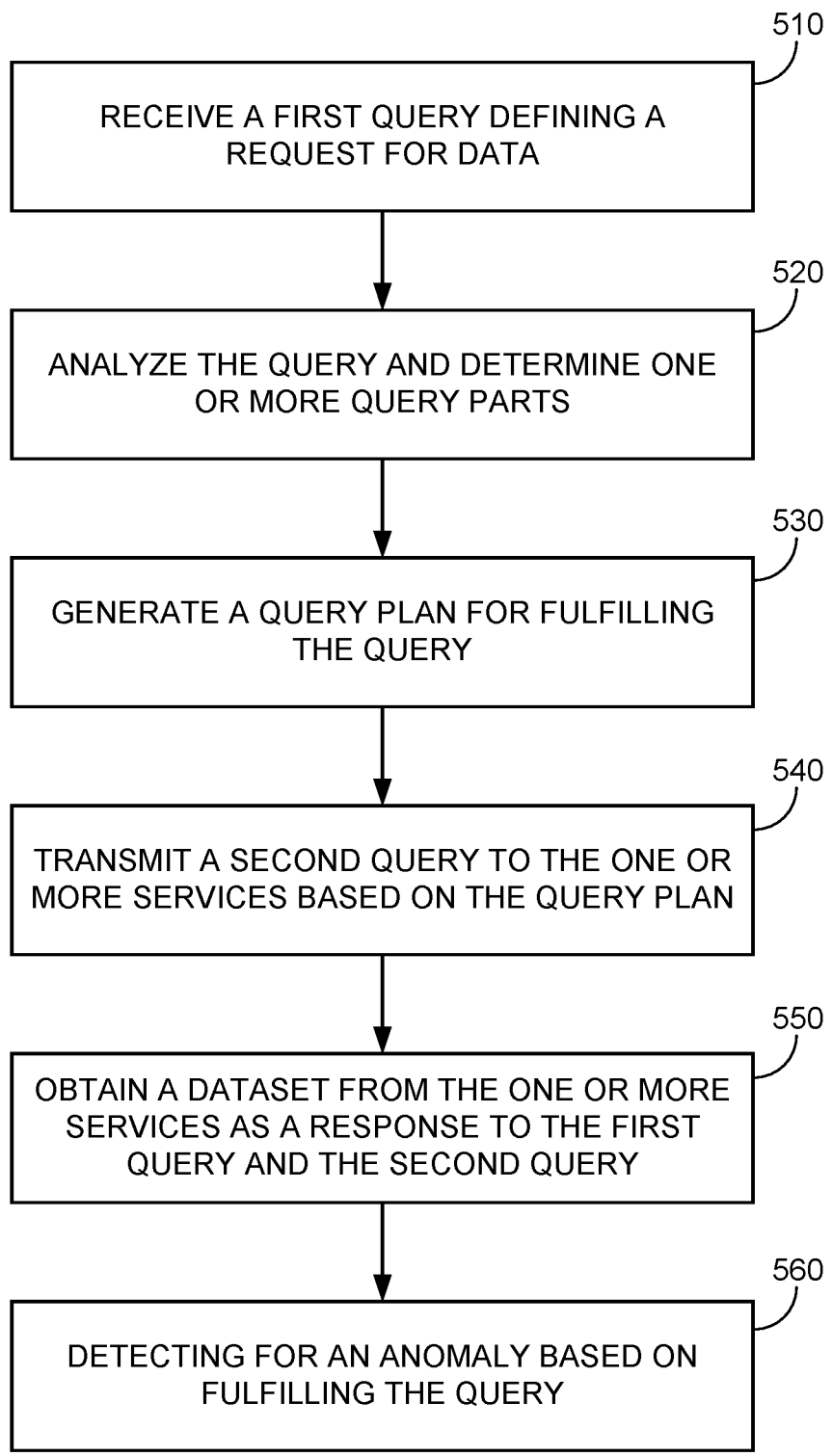
FIG. 5 depicts a method for optimizing network configurations for fulfilling a query, according to some examples.

FIG. 5 depicts a method 500 for optimizing network configurations for fulfilling a query using one or more services, according to some examples. At 510, the method 500 includes receiving a first query defining a request for data. In some examples, the query may be received by a first computing from a second computing device. In this regard, the first computing device is a server-based device, such as server 102 as shown in FIG. 1, and the second computing device may be the computing device 202, such as shown in FIG. 3. The query includes a request for data based on the business logic of the user. In some examples, the query may be based on the unified schema of the server 102. In this regard, in some examples, the second computing device may also interface with the server 102 to obtain the unified schema from the server 102 in order to provide the query to the server 102. In some examples, the server 102 may transmit the unified schema to the computing device 202 in response to a call from the computing device 202 requesting the unified schema. In other examples, the server 102 or the computing device 202 may periodically check with the other device for updates to the unified schema.

At 520, the method 500 includes analyzing the query and determining one or more query parts. The server 102 receives the query and analyzes the query to determine an efficient network configuration for fulfilling the query using the nodes in the network layer. The analysis includes a determination of the respective application service that owns the data being requested. In some examples, the analysis also includes parsing the query into one or more query parts based on the requested data. In other examples, the query parsing may be based on the respective application service that owns the data being requested in the query part. For example, a query may be parsed into a first query part requesting data from a first application service and a second query part requesting data from a second application service. Additionally, in some examples, the query parsing may be based on the nodes and routes between the nodes that serve the query part. Each query part of the one or more query parts is then interpolated into a data packet and forwarded along the selected nodes for the query part and to the respective application service that owns the requested data. In some examples, the interpolation of the query part may also be based on the respective application service that owns the data. In some examples, the interpolation may be based on the efficient network configuration for the query part through the nodes at the network layer. For example, a data packet may include a first query part and a second query part, where a particular application service owns the data being requested in the first query part and the second query part. In another example, a first data packet may include a first query part and a second data packet may include a second query part, where the first and second data packets are to be transmitted to a particular application service and where the second query part is dependent upon execution of the first query part before being transmitted to the particular application service.

In some examples, analyzing the query may further include classification of the one or more query parts as a static query part and dynamic query part. Additionally, in some examples, analyzing the query further includes caching the one or more query parts to reduce a network payload size. In some examples, the classification of the static query part may be determined based on the query part being mapped to a particular application service using a particular network configuration that has not changed for a fixed number of queries. In some examples, a static query part may be determined based on the nodes that serve the query part. In other examples, the static query part may also be determined based on the routes between the nodes that serve the query part. In another example, the static query part may be based on the requested data from the application service. For example, a static query part may invoke a specific series of nodes including the same routes between the nodes, and a specific application service (e.g., subgraph) that has remained consistent over the last five queries. In some examples, dynamic query parts may be for data that has not been previously requested or mapped or based on a query part that has not exceeded the fixed number of queries. In other examples, dynamic query parts may include a query part with dependencies from other query parts or other services. In some examples, the query may be classified as a static query or a dynamic query. For example, a static query may be a query that is regularly received from a particular user having a network configuration that may have remained static for a fixed number of queries.

In some examples, the method 500 includes caching the query to reduce a payload size. In some examples, caching the query may include caching one or more of the query parts parsed from the query. In other examples, caching the query includes caching the static query parts. For example, the query part may be cached in an edge cache. In some examples, the method 500 may include determining a TTL for the static query part. In this regard, the TTL is based on a time the query part is cached before being deleted from the cache to prevent the network configuration from being determined each instance a static query part is received while also establishing a limit the network configuration for the static query part is stored in the cache to prevent the information from becoming stale or outdated, such as when a particular node in the configuration becomes bottlenecked due to new queries being routed through the particular node. In some examples, the TTL may be associated with a number of times the static query may be forwarded as a data packet before being removed from the cache.

In some examples, the method 500 includes assigning a hash identifier to the query. In other examples, the method 500 includes assigning a hash identifier to the query parts. Additionally, assigning the hash identifier may be based on the classification of the query or query part as a static or dynamic query (or query part). In other examples, the hash identifier may be assigned based on the payload size of the query or query part. Accordingly, in some examples, the hash identifier may be received at the server 102 or the node instead of the query part and the server 102 or the node may obtain the query or query part from a cache by referencing the hash identifier, thereby reducing the payload size.

At 530, the method 500 includes generating a query plan for fulfilling the query. The query plan includes the one or more query parts. In some examples, the query plan provides for the network configuration and includes instructions to the one or more nodes to fulfill the one or more query parts. In some examples, the query plan may be also based on the unified schema which defines the application services and the data that each application service owns. In some examples, the network configuration may include the nodes assigned to handle each query part and the routes between the nodes. In other examples, the query plan may define a root node (e.g., resolver) and one or more child nodes tasked with executing the query plans. Additionally, in some examples, the root resolver may determine the query plan and monitors and controls the operation of the child resolvers in fulfilling the query plan.

In some examples, the query plan may be further based on patterns for invoking the one or more services. Accordingly, in some examples, the method 500 includes determining asynchronous and reactive patterns for invoking the one or more services to fulfill the query plan. Additionally, in some examples, the method 500 includes controlling an operation of the one or more nodes based on the asynchronous and reactive patterns to fulfill the query. The patterns for invoking the one or more services to obtain the requested data provide for optimized orchestration of the nodes at the network layer and to optimize query fulfillment efficiency. In some examples, the patterns may be based on dependencies of a service on completion of another service. For example, a query or query part may depend on data corresponding to individual store sales before obtaining data corresponding to total sales of the customer. In some examples, determining the query plan includes obtaining polling data including schemas published by the one or more services. In other examples, the polling data may also include route data. The schema corresponds to the framework and data structure for each application service in application services 152 to enable the server 102 and the user to submit a query including a request for data to the application services 152 and for the application services 152 to return data as output in response to the query.

Additionally, in some examples, the method 500 includes validating the published schema with the one or more services and creating a unified schema based on the validated schema. Additionally, in some examples, the method 500 includes determining the routing to one or more nodes and to one or more services based on the query plan and controlling an operation of the one or more nodes to fulfill the query plan. Prior to integration of the schemas into a unified schema, the server 102 parses the schema to determine the definitions, classes, objects, or other types of data as defined in the schema. The server 102 may validate the published schemas with the application service that corresponds to the schema. This reduces the time for integration of the schemas into the user's ecosystem as the services are validated at the network layer by server 102, thereby saving from having to perform this validation by computing devices external to the system 100. In some examples, validation may include querying the respective service for data based on the schema and validating that the returned data corresponds to the requested data. In some examples, the machine learning model may determine the unified schema. In some examples, the machine learning model may validate the schema with the services. In some examples, the polled data may include the validated schema. In other examples, the polling data may include the unified schema. In some examples, the unified schema may be iteratively updated with newly validated schemas. Additionally, in other examples, the polling data includes the route data. In some examples, the unified schema may be further based on the nodes and the route data.

At 540, the method 500 includes transmitting a second query to the one or more application services based on the query plan. In some examples, the second query may include the one or more query parts that are parsed from the query based on the query plan. Each query part is interpolated into a data packet and forwarded to a node or nodes and then transmitted to the respective application service that owns that data being requested. Based on the query plan, the server 102 forwards the data packet to the series of nodes and then transmits the query part to the respective application service according to the query plan. In some examples, the query received at the server 102 may be a first query. Additionally, in some examples, the second query may be one or more second queries containing the one or more query parts where each of the one or more second queries are transmitted to the respective application service at application services 152 based on the query plan.

At 550, the method 500 includes obtaining a dataset from the one or more application services as a response to the first query and the second query. The nodes at the server 102 receives data as output from each application services 152 that received the request for data according to the query plan. In some examples, the application services 152 returns the data as a response to the server 102. In some examples, the data as output may be from each of the respective application service in application services 152. Accordingly, in some examples, the server 102 may receive one or more datasets as response to the one or more query parts and the server 102 may compile the one or more datasets to generate a response dataset based on the datasets received from the services in the application services 152. In some examples, the response dataset may be generated based on the query plan. Therefore, in some examples, the query plan may provide for controlling the nodes to return the one or more datasets from the respective application service to the root node to compile that data received at the root node into the response dataset prior to being transmitted to the computing device 202 as a response to the query. In some examples, the method 500 includes transmitting the response dataset to the second computing device in response to the query.

At step 560, the method includes detecting for an anomaly based on fulfilling the query. The query fulfillment generates data based on the operational characteristics of the applications and components at the server 102. For example, the metric data may include latency and throughput data at each node tasked in fulfilling the query. In some examples, detecting for the anomaly includes identifying and extracting object instances from the data generated during the query fulfillment indicative of an anomaly. In some examples, the object instances may be based on the values exceeding a predefined threshold. In other examples, the object instances may be based on the values approaching the predefined threshold. In some examples, the thresholds may be based on a reference dataset and the identification and extraction of the object instances may be based on comparison of the metric dataset to the reference dataset. In some examples, a machine learning model may analyze the data and apply any of plurality of models or techniques to the data to identify and extract the object instances indicative of an anomaly. In some examples, the thresholds may be set by an individual associated with the entity (e.g., system administrator). In some examples, the thresholds may be based on SLOs, SLAs, etc. as established between a user and the entity that operates the server 102.

Additionally, in some examples, the method 500 further includes determining a latency at the nodes for query fulfillment. The current query fulfillment provides metrics data corresponding to the operational characteristics at each node. Accordingly, in some examples, the server 102 may determine the query plan based on this metrics data including the latency at the nodes to optimize the network configuration based on metrics data such as the latency at the nodes.

In some examples, the method 500 may include generating an alert based on the anomaly detection. For example, the server 102 may generate the alert on a graphical user interface displayed on a display device in communicable connection with the server 102. In some examples, the alert may be generated in near real-time. For example, the detection and alert may be made within 30 minutes of the occurrence of the anomaly. In some examples, the alert may be generated in real-time.

Figure 6:
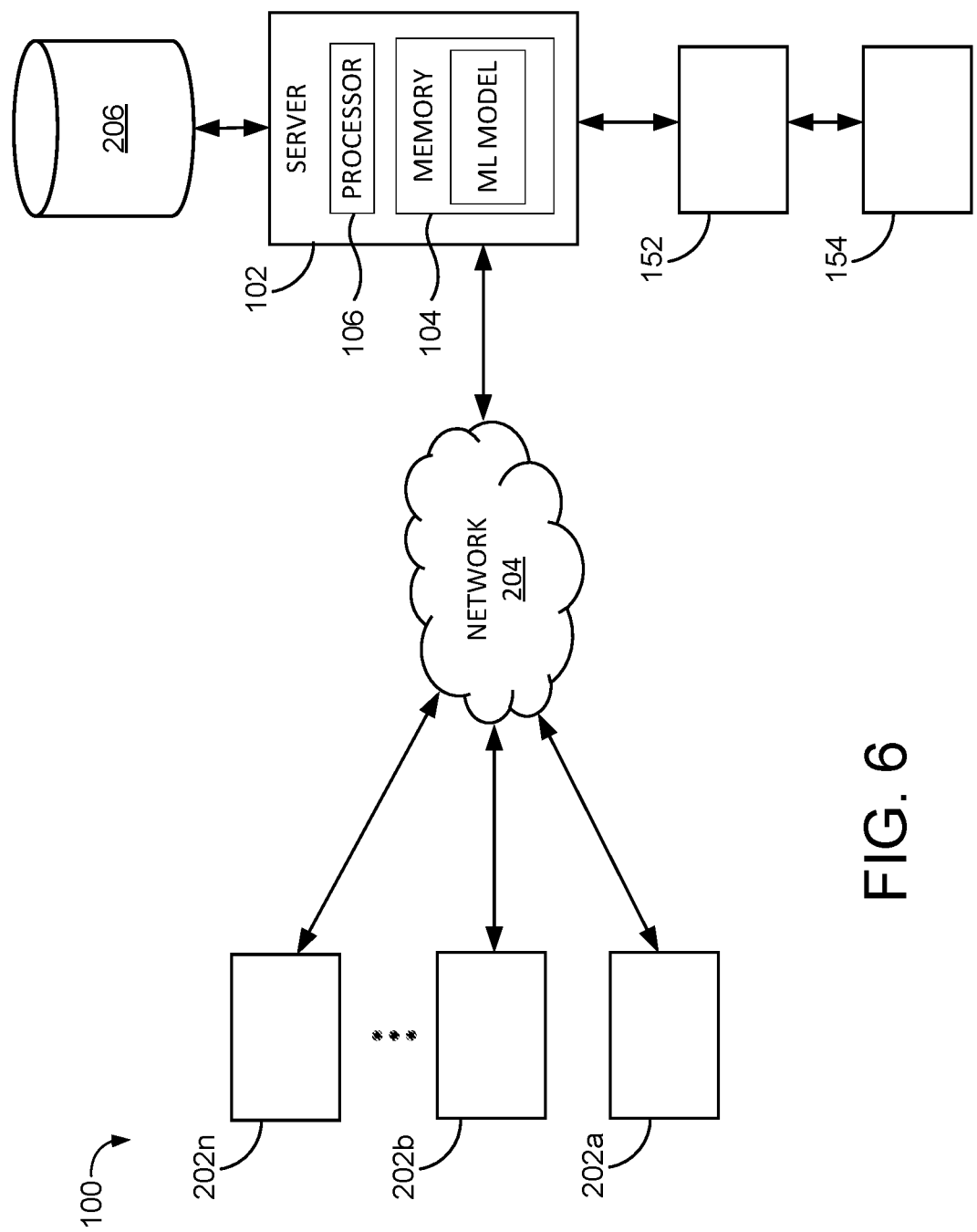
FIG. 6 depicts an example block diagram depicting a computer-based system and platform examples.

FIG. 6 depicts a block diagram depicting a computer-based system and platform, according to some examples.

Not all of these components may be required to practice one or more examples, and variations in the arrangement and type of the components may be made without departing from the spirit or scope of various examples of the present disclosure. In various examples, the network based system 100 may include the server 102. The server 102 may be in communicable connection with a network 204 to receive and transmit information corresponding to dataset with other computing devices in communicable connection with the network 204. In some examples, the server 102 may be in communicable connection with external computing devices 202a, 202b through 202n to receive one or more datasets from external computing devices 202a, 202b through 202n corresponding to a query including a request for data.

In various examples, the server 102 may be electrically communicable with at least one external computing device of the external computing devices 202a, 202b through 202n to receive the query from the at least one external computing device. In various examples, the server 102 may receive one or more queries from at least one of the external computing devices 202a, 202b through 202n and the server 102 may provide a response dataset to at least one of the external computing devices 202a, 202b through 202n as a response to the query.

In some examples, the server 102 may be any type of processor-based platforms that are connected to a network 204 such as, without limitation, servers, personal computers, digital assistants, personal digital assistants, smart phones, pagers, digital tablets, laptop computers, Internet appliances, cloud-based processing platforms, and other processor-based devices. In some examples, the server 102 may be specifically programmed with one or more application programs in accordance with one or more principles/methodologies detailed herein. In some examples, the server 102 may be specifically programmed with one or more machine learning models in accordance with one or more principles/methodologies detailed herein. In some examples, the server 102 may operate on any of a plurality of operating systems capable of supporting a browser or browser-enabled application, such as Microsoft™, Windows™, and/or Linux.

In some examples, the external computing devices 202a, 202b through 202n shown each may include at least includes a computer-readable medium, such as a random-access memory (RAM) or FLASH memory, coupled to a processor. In some examples, examples of the external computing devices 202a through 202n may be any type of processor-based platforms that are connected to a network 204 such as, without limitation, servers, personal computers, digital assistants, personal digital assistants, smart phones, pagers, digital tablets, laptop computers, Internet appliances, cloud-based processing platforms, and other processor-based devices. In some examples, external computing devices 202a through 202n may be specifically programmed with one or more application programs in accordance with one or more principles/methodologies detailed herein. In some examples, external computing devices 202a through 202n may operate on any of a plurality of operating systems capable of supporting a browser or browser-enabled application, such as Microsoft™, Windows™, and/or Linux. In some examples, external computing devices 202a through 202n shown may interface with, for example, the server 102 by executing a browser application program such as Microsoft Corporation's Internet Explorer™, Apple Computer, Inc.'s Safari™, Mozilla Firefox, and/or Opera to transmit the query through an interface. In some examples, through the server 102, the entity associated with the server 102 may communicate over the exemplary network 204 with the external computing devices 202a through 202n to provide a dataset in response to the query.

In some examples, the network based system 100 may include at least one database 206. The database 206 may be any type of database, including a database managed by a database management system (DBMS). In some examples, an exemplary DBMS-managed database may be specifically programmed as an engine that controls organization, storage, management, and/or retrieval of data in the respective database. In some examples, the exemplary DBMS-managed database may be specifically programmed to provide the ability to query, backup and replicate, enforce rules, provide security, compute, perform change and access logging, and/or automate optimization. In some examples, the exemplary DBMS-managed database may be chosen from Oracle database, IBM DB2, Adaptive Server Enterprise, FileMaker, Microsoft Access, Microsoft SQL Server, MySQL, PostgreSQL, and a NoSQL implementation. In some examples, the exemplary DBMS-managed database may be specifically programmed to define each respective schema of each database in the exemplary DBMS, according to a particular database model of the present disclosure which may include a hierarchical model, network model, relational model, object model, or some other suitable organization that may result in one or more applicable data structures that may include fields, records, files, and/or objects. In some examples, the exemplary DBMS-managed database may be specifically programmed to include metadata about the data that is stored.

In some examples, the network based system 100 may also include and/or involve one or more cloud components. Cloud components may include one or more cloud services such as software applications (e.g., queue, etc.), one or more cloud platforms (e.g., a Web front-end, etc.), cloud infrastructure (e.g., virtual machines, etc.), and/or cloud storage (e.g., cloud databases, etc.). In some examples, the computer-based systems/platforms, computer-based devices, components, media, and/or the computer-implemented methods of the present disclosure may be specifically configured to operate in or with cloud computing/architecture such as, but not limiting to infrastructure a service (IaaS), platform as a service (PaaS), and/or software as a service (SaaS).

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.).

Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. In some examples, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth.

Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. Of note, various examples described herein may be implemented using GraphQL. In some examples, the examples described herein may be implemented using REST. In various examples described herein may be further implemented using any appropriate hardware and/or computing software languages (e.g., C++, Objective-C, Swift, Java, JavaScript, Python, Perl, QT, etc.).

In some examples, one or more of exemplary inventive computer-based systems/platforms, exemplary inventive computer-based devices, and/or exemplary inventive computer-based components of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

As used herein, the term "server" should be understood to refer to a service point which provides processing, database, and communication facilities. By way of example, and not limitation, the term "server" can refer to a single, physical processor with associated communications and data storage and database facilities, or it can refer to a networked or clustered complex of processors and associated network and storage devices, as well as operating software and one or more database systems and application software that support the services provided by the server. Cloud components and cloud servers are examples.

In some examples, as detailed herein, one or more of the computer-based systems of the present disclosure may obtain, manipulate, transfer, store, transform, generate, and/or output any digital object and/or data unit (e.g., from inside and/or outside of a particular application) that can be in any suitable form such as, without limitation, a file, a contact, a task, an email, a message, a map, an entire application (e.g., a calculator), data points, and other suitable data. In some examples, as detailed herein, one or more of the computer-based systems of the present disclosure may be implemented across one or more of various computer platforms such as, but not limited to: (1) Linux™, (2) Microsoft Windows™, (3) OS X (Mac OS), (4) Solaris™, (5) UNIX™ (6) VMWare™, (7) Android™, (8) Java Platforms™, (9) Open Web Platform, (10) Kubernetes or other suitable computer platforms. In some examples, illustrative computer-based systems or platforms of the present disclosure may be configured to utilize hardwired circuitry that may be used in place of or in combination with software instructions to implement features consistent with principles of the disclosure. Thus, implementations consistent with principles of the disclosure are not limited to any specific combination of hardware circuitry and software. For example, various examples may be embodied in many different ways as a software component such as, without limitation, a stand-alone software package, a combination of software packages, or it may be a software package incorporated as a "tool" in a larger software product.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application, or as a web-enabled software application. For example, exemplary software specifically programmed in accordance with one or more principles of the present disclosure may also be embodied as a software package installed on a hardware device.

In some examples, exemplary inventive computer-based systems/platforms, exemplary inventive computer-based devices, and/or exemplary inventive computer-based components of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

In some examples, the exemplary inventive computer-based systems/platforms, the exemplary inventive computer-based devices, and/or the exemplary inventive computer-based components of the present disclosure may be configured to securely store and/or transmit data by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

All prior patents and publications referenced herein are incorporated by reference in their entireties.

Throughout the specification and claims, the following terms take the meanings explicitly associated herein, unless the context clearly dictates otherwise. The phrases "in one example," "in an example," and "in some examples" as used herein do not necessarily refer to the same embodiment(s), though it may. Furthermore, the phrases "in another example" and "in some other examples" as used herein do not necessarily refer to a different embodiment, although it may. All examples of the disclosure are intended to be combinable without departing from the scope or spirit of the disclosure.

As used herein, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

What is claimed is:

1. A computer-implemented method comprising:

receiving, by a first computing device at a gateway, a first query defining a request for data from at least two application services of a plurality of application services;

parsing, by the first computing device, the first query into two or more query parts based on a schema of the plurality of application services, each query part defining a portion of the request for data from a respective application service of the two or more application services based on the schema;

obtaining, by the first computing device, route data corresponding to routing paths to the plurality of application services using a plurality of nodes;

generating, by the first computing device and via a machine learning model, a query plan mapping one or more routing paths to fulfill the two or more query parts based on the obtained route data, each routing path being for transmission of a respective query part between the gateway and the respective application service via one or more intermediate nodes, wherein the query plan determines each routing path based on an availability of each of the one or more intermediate nodes and a throughput metric of the one or more intermediate nodes of each routing path;

classifying each of the two or more query parts as a static query part or a dynamic query part;

determining a hash identifier for each static query part in a cache;

transmitting, by the first computing device, for each dynamic query part, a respective second query to the respective application service through the one or more nodes along the respective routing path;

transmitting, for each static query part, the respective hash identifier to the respective application service along the respective routing path;

obtaining, by the first computing device, a dataset from the one or more application services as a response to the second queries and to the hash identifiers; and monitoring, by the first computing device and via the machine learning model, for an anomaly at the one or more intermediate nodes along the at least one routing path based on metrics data generated from fulfilling the query plan.

2. The computer-implemented method according to claim 1, further comprising:

determining the one or more intermediate nodes and the two or more application services of the plurality of application services to invoke based on the query plan; and controlling an operation of the one or more intermediate nodes to fulfill the query plan.

3. The computer-implemented method according to claim 2, wherein generating the query plan further comprises:

determining patterns for invoking the one or more intermediate nodes to fulfill the query plan; and controlling, by the first computing device, the operation of the one or more intermediate nodes based on the patterns to fulfill the first query.

4. The computer-implemented method according to claim 3, wherein the patterns comprise asynchronous patterns and reactive patterns for activating the plurality of application services to provide for orchestration of the plurality of nodes to optimize query fulfillment efficiency.

5. The computer-implemented method according to claim 1, further comprising:

obtaining, by the first computing device, polling data comprising schemas published by each of the plurality of application services;

validating the published schemas with the plurality of application services; and creating a unified schema based on the validated schema, wherein the one or more query parts are parsed from the first query based on the unified schema of the plurality of application services.

6. The computer-implemented method according to claim 5, wherein the query plan is determined based on the unified schema.

7. The computer-implemented method according to claim 1, wherein the static query parts are cached based on a caching strategy;

wherein the caching is further based on a time to live (TTL).

8. The computer-implemented method according to claim 1, wherein detecting for the anomaly further comprises:

extracting, by the first computing device and via the machine learning model, object instances in data generated during a fulfillment of the second queries indicative of the anomaly; and generating, by the first computing device, an alert based on detecting the anomaly, wherein the alert is generated in near real-time.

9. The computer-implemented method according to claim 8, wherein the query plan is further based on the data generated during a previous query fulfillment.

10. The computer-implemented method according to claim 8, wherein the query plan is further based on a latency metric of the one or more intermediate nodes.

11. A system comprising:

one or more processors; and a non-transitory computer readable media having stored thereon instructions that are executable by the one or more processors to cause the system to perform operations comprising:

receive a first query defining a request for data from at least two application services of a plurality of application services, analyze the first query and determine two or more query parts based on the first query and a schema of the plurality of application services, each query part defining a portion of the request for data from a respective application service of the at least two application services based on the schema;

obtain route data corresponding to routing paths to the plurality of application services using a plurality of nodes, generate, via a machine learning model, a query plan mapping at least one routing path mapped to fulfill the two or more query parts of the first query based on the obtained route data, wherein the at least one routing path being for transmission of a respective query part of the one or more query parts between a gateway that received the first query and the respective application service via one or more nodes, wherein the query plan determines the at least one routing path based on availability of each of the one or more nodes and a throughput metric of the one or more nodes of the at least one routing path, classify each of the two or more query parts as a static query part or a dynamic query part, determine a hash identifier for each static query part in a cache, determine the one or more nodes and the at least two application service to invoke based on the query plan, control an operation of the one or more nodes to fulfill the query plan, transmit, for each dynamic query part, at least one respective second query including respective data packets corresponding to the dynamic query part to the respective application service through the one or more nodes along the at least one routing path, transmit, for each static query part, the respective hash identifier to the respective application service through the one or more nodes along the at least one routing path;

obtain a dataset from the at least one application service as a response to the first query and the at least one second query and the hash identifiers, and detect for an anomaly at the one or more nodes along the at least one routing path based on fulfilling the first query.

12. The system according to claim 11, wherein generating the query plan causes the system to further perform operations comprising:

determine patterns for invoking the one or more nodes to fulfill the query plan; and control the operation of the one or more nodes based on the patterns to fulfill the first query.

13. The system according to claim 12, wherein the patterns comprise asynchronous patterns and reactive patterns for activating the plurality of application services to provide for orchestration of the plurality of nodes to optimize query fulfillment efficiency.

14. The system according to claim 11, wherein the system further performs operations comprising:
- obtain polling data comprising schemas published by each of the plurality of application services;
- validate the published schema with the plurality of application services; and
- create a unified schema based on the validated schema of the plurality of application services,
- wherein the one or more query parts are determined based on the unified schema.

15. The system according to claim 14, wherein the query plan is determined based on the unified schema.

16. The system according to claim 11, wherein detecting for the anomaly causes the system to further perform operations comprising:
- extract, via the machine learning model, object instances in data generated during a fulfillment of the first query indicative of the anomaly; and
- generate an alert based on detecting the anomaly, wherein the alert is generated in near real-time.

17. A computer program product embodied on one or more non-transitory computer readable media having stored thereon instructions that are executable by one or more processors to cause the computer program product to perform operations comprising:
- receive a first query defining a request for data from at least two application services of a plurality of application services,
- obtain route data corresponding to routing paths to the plurality of application services using a plurality of nodes,
- analyze the first query and determine a query plan including two or more query parts based on a schema of the plurality of application services, each of the two or more query parts defining a respective query for data from a respective one of the at least two application services, and the query plan comprising a mapping of at least one routing path for transmission of the two or more query parts between a gateway that received the first query and the at least two application services via one or more nodes, wherein the query plan determines each of the at least one routing path based on availability of each of the one or more nodes and a throughput metric of the one or more nodes of each of the at least one routing path,
- determine asynchronous patterns and reactive patterns for invoking the one or more nodes to fulfill the query plan,
- classify the two or more query parts as static query parts and dynamic query parts,
- cache the static query parts in at least one cache based on a TTL to reduce a network payload size,
- determine a hash identifier for each static query part in the cache;
- determine the one or more nodes and the at least two application services to invoke based on the query plan,
- control an operation of the one or more nodes to fulfill the query plan,
- transmit, for each dynamic query part, at least one respective second query including data packets corresponding to the dynamic query part to the respective application service through the one or more nodes along the at least one routing path based on the query plan,
- transmit, for each static query part, the respective hash identifier to the respective application service through the one or more nodes along the at least one routing path;
- obtain a dataset from the at least two application services in response to the first query and the at least one second query and to the hash identifiers, and
- detect for an anomaly at the one or more nodes along the at least one routing path based on fulfilling the first query.

18. The computer program product according to claim 17, further performing operations comprising:
- obtain polling data comprising schemas published by the plurality of application services,
- validate the published schema with the plurality of application services, and
- create a unified schema based on the validated schema,
- wherein the query plan and the one or more query parts are determined based on the unified schema.

19. The computer program product according to claim 17, wherein detecting for the anomaly causes the computer program product to further perform operations comprising:
- extract, via a machine learning model, object instances in data generated during the query fulfillment indicative of the anomaly, and
- generate an alert based on detecting the anomaly, wherein the alert is generated in near real-time.

* * * * *